(12) United States Patent
Ayub et al.

(10) Patent No.: US 10,384,613 B2
(45) Date of Patent: Aug. 20, 2019

(54) ENHANCED VEHICLE SIDE VIEW MIRROR ASSEMBLY

(71) Applicants: Hamid Ayub, Plantation, FL (US); Mikael A. Ayub, Plantation, FL (US)

(72) Inventors: Hamid Ayub, Plantation, FL (US); Mikael A. Ayub, Plantation, FL (US)

(*) Notice: Subject to any disclaimer, the term of this patent is extended or adjusted under 35 U.S.C. 154(b) by 0 days.

(21) Appl. No.: 15/899,700

(22) Filed: Feb. 20, 2018

(65) Prior Publication Data

US 2019/0176700 A1 Jun. 13, 2019

Related U.S. Application Data

(60) Provisional application No. 62/597,683, filed on Dec. 12, 2017, provisional application No. 62/628,054, filed on Feb. 8, 2018.

(51) Int. Cl.
| | |
|---|---|
| *B60R 1/00* | (2006.01) |
| *B60R 1/06* | (2006.01) |
| *B60R 1/02* | (2006.01) |
| *B60R 1/08* | (2006.01) |
| *B60R 1/12* | (2006.01) |

(52) U.S. Cl.
CPC .............. *B60R 1/025* (2013.01); *B60R 1/006* (2013.01); *B60R 1/007* (2013.01); *B60R 1/08* (2013.01); *B60R 2001/1223* (2013.01)

(58) Field of Classification Search
CPC ........... B60R 1/006; B60R 1/007; B60R 1/08; B60Q 1/24; B60Q 1/02; B60Q 1/2665; B60Q 1/2619
See application file for complete search history.

(56) References Cited

U.S. PATENT DOCUMENTS

| | | | |
|---|---|---|---|
| 4,482,210 A | 11/1984 | Brookman | |
| 6,547,405 B2* | 4/2003 | Jacobs | ...................... B60R 1/02 33/264 |
| 9,340,157 B2* | 5/2016 | Sulc | ........................ B60R 1/025 |
| 9,598,015 B1 | 3/2017 | Ambarella | |
| 2004/0114260 A1 | 6/2004 | Bartnick | |
| 2007/0058276 A1* | 3/2007 | Behbehani | ................ B60R 1/08 359/883 |
| 2010/0103545 A1 | 4/2010 | Forbes et al. | |
| 2013/0258512 A1 | 10/2013 | Raz et al. | |

OTHER PUBLICATIONS

International Search Report and Written Opinion dated May 17, 2018 for International Application No. PCT/US2018/019126.

* cited by examiner

*Primary Examiner* — William C. Dowling
(74) *Attorney, Agent, or Firm* — Nelson Mullins Riley & Scarborough LLP

(57) ABSTRACT

A side view mirror assembly for use by an operator of an vehicle including a mirror housing mounted to an outer surface of the vehicle, a side view mirror including a reflective surface, the side view mirror being mounted in the mirror housing so that the side view mirror reflects items disposed rearwardly of the vehicle, wherein the side view mirror is configured for adjustment with respect to the mirror housing so that an angle of the mirror with respect to the mirror housing is selectively changeable, and a first marking that is visible on the reflective surface of the side view mirror so that a reflection of a portion of the vehicle falls within a first portion of the reflective surface that is defined by the first marking.

12 Claims, 7 Drawing Sheets

ENHANCED VEHICLE SIDE VIEW MIRROR ASSEMBLY

CLAIM OF PRIORITY

This application claims the benefit of U.S. Provisional Application No. 62/597,683 filed Dec. 12, 2017, and U.S. Provisional Application No. 62/628,054 filed Feb. 8, 2018, which disclosures are hereby incorporated by reference in their entirety into the specification of this application.

FIELD OF THE INVENTION

The present invention relates generally to motor vehicles. More particularly, the present invention relates to driving assistance equipment, such as side mirror assemblies, for use on vehicles.

BACKGROUND OF THE INVENTION

With the ever increasing populations around the world, it is not surprising that roadways are experiencing greater traffic from motor vehicles than ever before. Typically, increased traffic leads to increased commute times, increased fuel costs, and decreased efficiencies as workers spend increased amounts of time commuting. As well, increased costs of shipping items due to both time delays and fuel costs may lead to increased prices. These costs are exacerbated by vehicle accidents which cause further time delays and increased costs due to damaged vehicles, not to mention the increased potential for harm to individuals.

Vehicle accidents can occur for many reasons, and the inability for drivers to properly view their surroundings while operating their vehicles is of primary concern. Even in ideal driving conditions, mis-positioned side view mirrors can lead to drivers being unable to detect other vehicles/individuals they should otherwise be able to see, as shown in FIGS. 1A and 1B. Existing side view mirrors can be difficult to properly position in that the driver often merely adjusts them until they feel comfortable with what they can view in the mirrors. However, just because a driver is comfortable with the position of a mirror does not mean the position is proper. Improperly positioned mirrors can lead to "blind spots" in the driver's field of view meaning that the driver may not be able to view a vehicle in the in the mirror although it is nearby.

For example, referring now to FIG. 1A, if the operator 10 of a lead vehicle 12 positions the side view mirrors 14 of the vehicle 12 inwardly too much, the field of view 16 is also angled inwardly more than desired. As such, a "blind spot" 18 is formed which may lead to a nearby vehicle 20 falling outside the operator's field of view 16. Herein, a "blind spot" is defined as an area near a first vehicle 12 in which a second vehicle 20 may not be detected in the side view mirrors by the first vehicle's operator. Referring additionally to FIG. 1B, a blind spot 18 may also be created by angling the side view mirrors 14 outwardly more than is needed.

As such, various organizations and vehicle manufacturers sometimes offer guidelines on how to best position vehicle side mirrors. However, many drivers are not aware of this fact and, even if they are, it can still be a daunting task to position the mirrors. Therefore, it is desirable that improved apparatus and methodologies be developed to assist drivers in positioning their vehicle's side mirrors.

The present invention recognizes and addresses considerations of prior art constructions and methods.

SUMMARY OF THE INVENTION

One embodiment of the present invention provides a side view mirror assembly for use by an operator of an vehicle, including a mirror housing mounted to an outer surface of the vehicle, a side view mirror including a reflective surface, the side view mirror being mounted in the mirror housing so that the side view mirror reflects items disposed rearwardly of the vehicle, wherein the side view mirror is configured for adjustment with respect to the mirror housing so that an angle of the mirror with respect to the housing is selectively changeable. A first marking is visible on the reflective surface of the side view mirror so that a reflection of a portion of the vehicle falls within a first portion of the reflective surface that is defined by the first marking.

Another embodiment of the present invention provides a method of adjusting an angle of a side view mirror of an vehicle in accordance with a position of an operator of the vehicle, including the steps of providing a sensor that is operatively engaged with a portion of the operator of the vehicle, determining a position of the portion of the operator of the vehicle, producing an electrical signal that is indicative of the position of the portion of the operator of the vehicle with respect to the side view mirror, and adjusting the angle of the side view mirror with respect to the vehicle based on the electrical signal.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
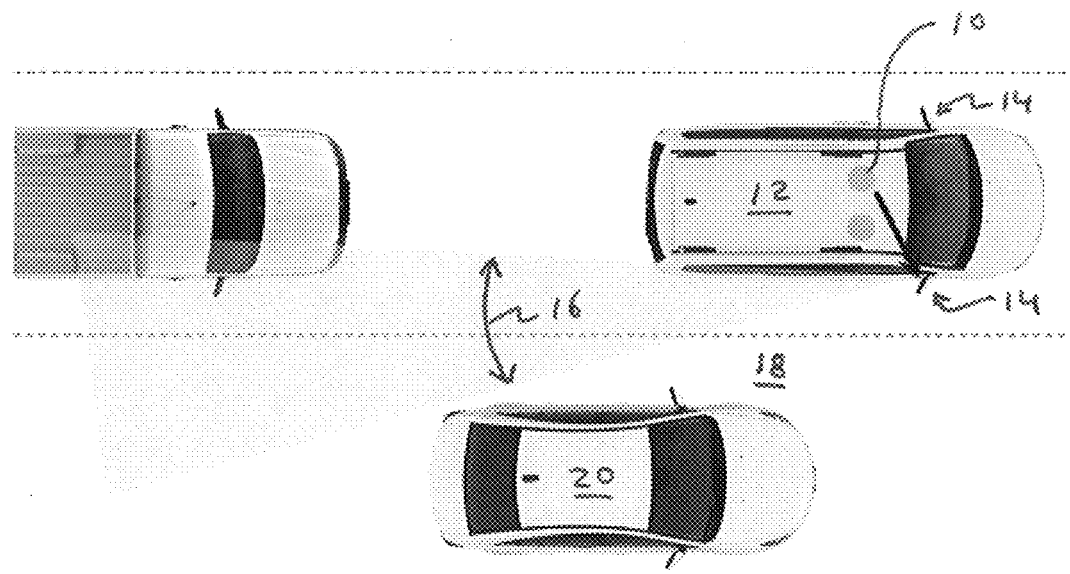
FIGS. 1A and 1B are schematic views of a lead vehicle having improperly adjusted side view mirrors so that the desired field of view is degraded.
Figure 1:
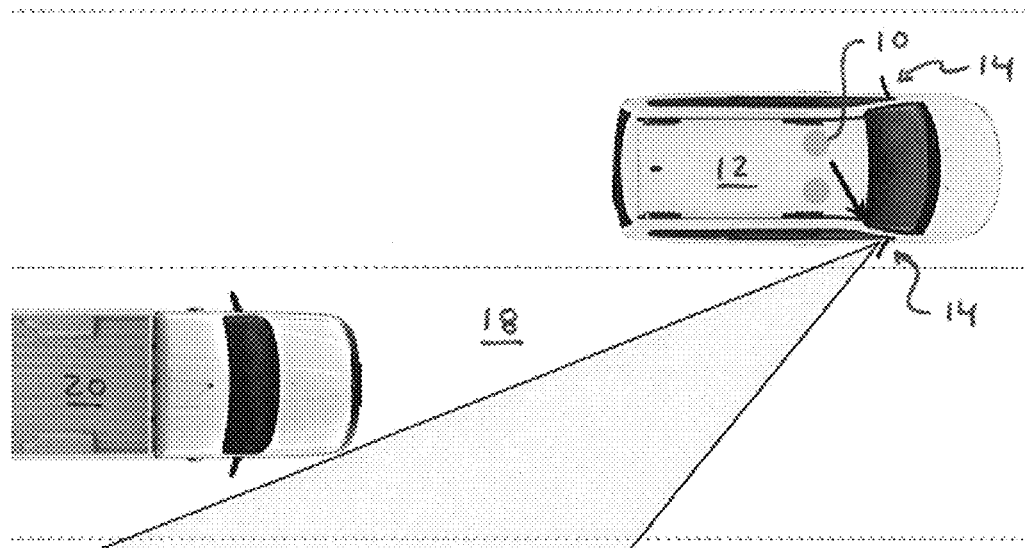

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
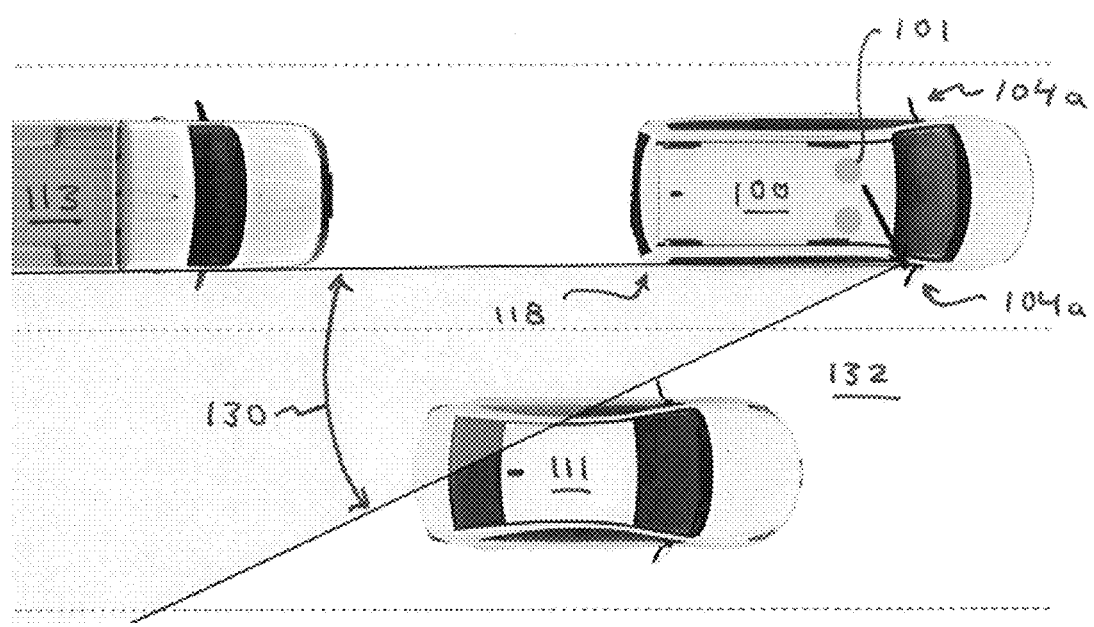
FIG. 2 is a schematic view of a lead vehicle having side view mirror assemblies in accordance with an embodiment of the present invention.
Figure 3A:
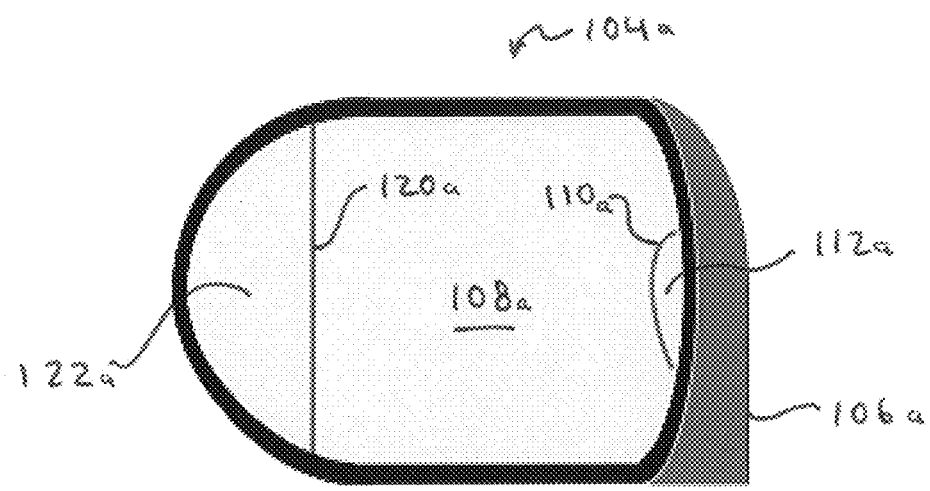
FIGS. 3A and 3B are plan views of a side view mirror assembly of the lead vehicle as shown in FIG. 2.
Figure 3B:
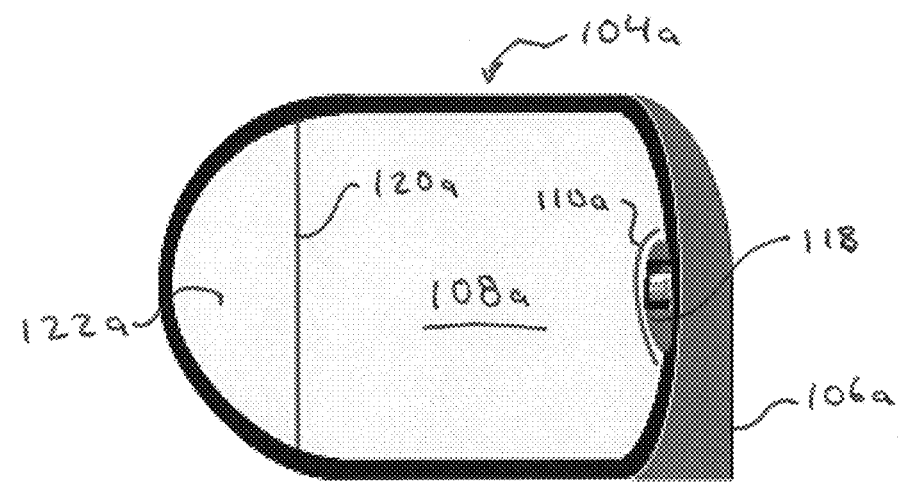
Figure 8:
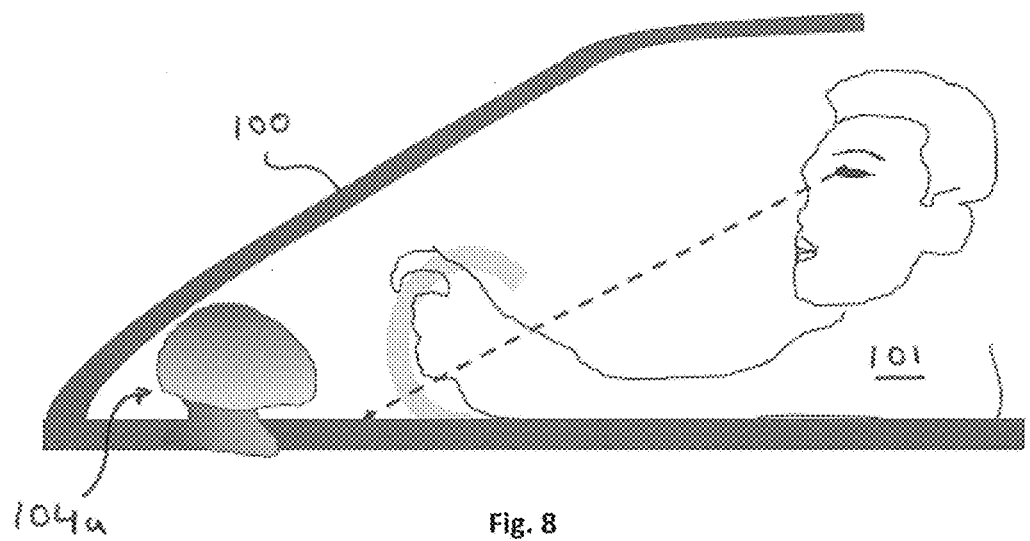
FIG. 8 is a partial side view of a vehicle including the side view mirror assembly as shown in FIGS. 3A and 3B.

As shown in FIGS. 2, 3A and 3B, a side view mirror assembly 104a in accordance with the present invention preferably includes a mirror housing 106a and a side view mirror 108a that is mounted within the mirror housing 106a by an adjustment mechanism (not shown). As best seen in FIG. 2, and additionally referring to FIG. 8, side view mirror assemblies 104a are mounted to an outer surface of a vehicle 100 in a position that allows an operator 101 of the vehicle 100 to view objects that are disposed rearwardly of the operator's position within the vehicle. For example, as shown in FIG. 2, the side view mirror assembly 104a that is disposed on the passenger side of the vehicle 100 allows the operator 101 to view both a first vehicle 111 and a second vehicle 113. The side view mirror assembly 104a, when adjusted properly, allows the operator's field of view 130 to include portions of both the first vehicle 111 and the second vehicle 113. Properly adjusting the side view mirror assemblies 104a minimizes any blind spot 132 that may exist near the vehicle 100.

Still referring to FIGS. 3A and 3B, the side view mirror assembly 104a additionally includes a first marking 110 and a second marking 120 that are visible on the side view mirror 108a. As shown, the first marking 110 is disposed adjacent the inward end of the side view mirror 108a (proximal from the vehicle) thereby defining a first portion 112a of the reflective surface of the side view mirror 108a, and the second marking 120 is disposed adjacent the outer end of the side view mirror 108a (distal from the vehicle) thereby defining a second portion 122a of the reflective surface of the side view mirror 108a. Referring specifically to FIG. 3B, when the side view mirror 108a is properly positioned, so that any potential blind spots 132 are minimized, a portion of the vehicle 100 is reflected in the first portion 112a of the side view mirror 108a. As shown in FIG. 2, when the side view mirror 108a is properly positioned, the operator 101 of the vehicle 100 should be able to see the reflection of the outermost portion of the rear bumper 118 on the passenger side of the vehicle 100 in the first portion 112a of the side view mirror 108a. In other embodiments, alternate portions of the vehicle 100 may be reflected by the first portion 112a of the side view mirror 108a, such as a rear door handle, when the side view mirror 108a is properly positioned.

Figure 9:
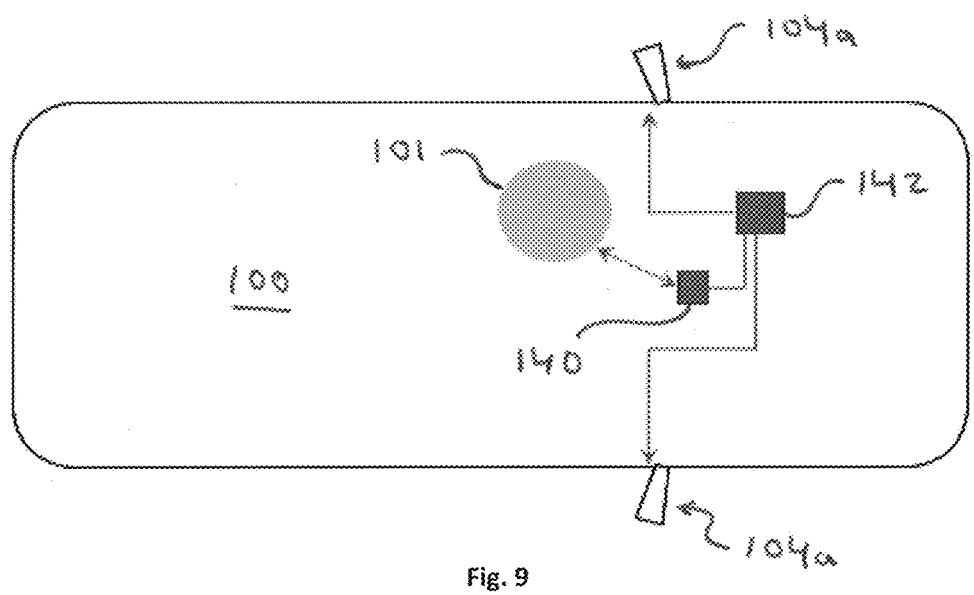
FIG. 9 is a schematic of an vehicle including a side view mirror assembly in accordance with an embodiment of the present invention.

Referring additionally to FIG. 9, in order to ensure that the desired portion of the vehicle 100 is reflected within the first portion 112a of the side view mirror 108a, the disclosed side view mirror assembly 104a includes a sensor 140 and a programmable logic controller 142 (processor) that automatically position the side view mirror 108a based upon a position of the head and/or eyes of the operator (FIG. 8), as discussed in greater detail below. Preferably, the programmable logic controller 142 uses one or both of face recognition software and lens focusing software to determine the position of head and/or eyes of the operator. Some examples of this software are, but not limited to, Google Face Recognition, Microsoft Cognitive Services, Luxroit Face Recognition, Tyco Facial Recognition, Reikan FoCal, and Datacolor Spyder Lenscal. Note, the second portion 122a of the side view mirror 108a represents the outermost portion of the operator's field of view 130 when the side view mirror is properly positioned.

Figure 10:
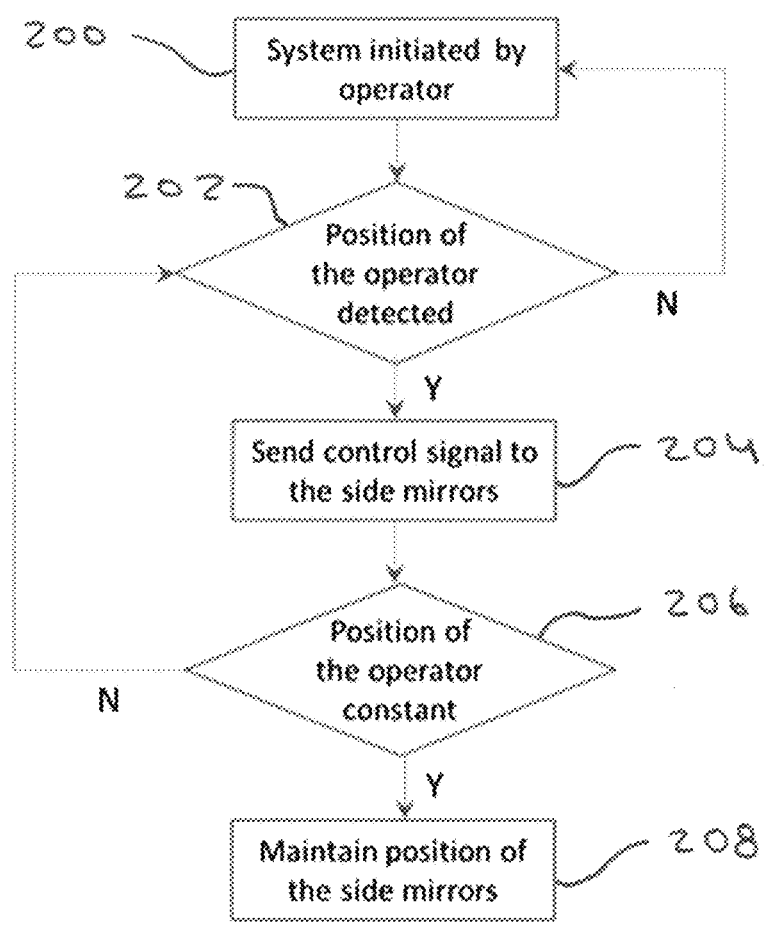
FIG. 10 is a flow chart of a side view mirror assembly adjustment sequence of a side view mirror assembly in accordance with the present invention.

Referring additionally to FIG. 10, the operation of an exemplary embodiment of the disclosed side view mirror assembly 104a is discussed. Preferably, the side view mirror assembly 104a is automatically adjusted at all times the corresponding vehicle 100 is being operated, i.e, when the engine is running. The automatic adjustment sequence of the side view mirror assembly 104a is initiated by the operator 101 starting the vehicle 100 (Step 200). Upon initiation of operation, the sensor 140 determines a position of a portion of the operator 101 (head, eyes, etc.) and sends a corresponding input signal (i.e., an electrical signal) to the programmable logic controller 142 (Step 202). If the position of the operator 101 is not detected, the sensor 140 will continue to monitor until it is, or in the alternative, until the vehicle 100 is turned off. Upon receiving the input signal from the sensor 140, the programmable logic controller 142 provides a control signal (i.e., an electrical signal) based thereon that is sent to side view mirror assembly 104a (Step 204). Upon receiving the control signal from the programmable logic controller 142, the side view mirror assembly 104a utilizes the internal adjustment mechanism to change the position of the side view mirror 108a with respect to the mirror housing 106 until the reflection of the desired portion of the vehicle 100, such as outer portion of the rear bumper 118, as shown in FIG. 3B, is disposed within the first portion 112a of the side view mirror 108a. If, at Step 206, the programmable logical controller 142 determines that the position of the operator 101 is constant, the position of the side view mirror 108a is maintained (Step 208). If, however, the position of the operator 101 is not constant, based upon the input signals provided by the sensor 140, the programmable logic controller 142 will provide the necessary control signals to automatically adjust the position of the side view mirror.

Figure 4:
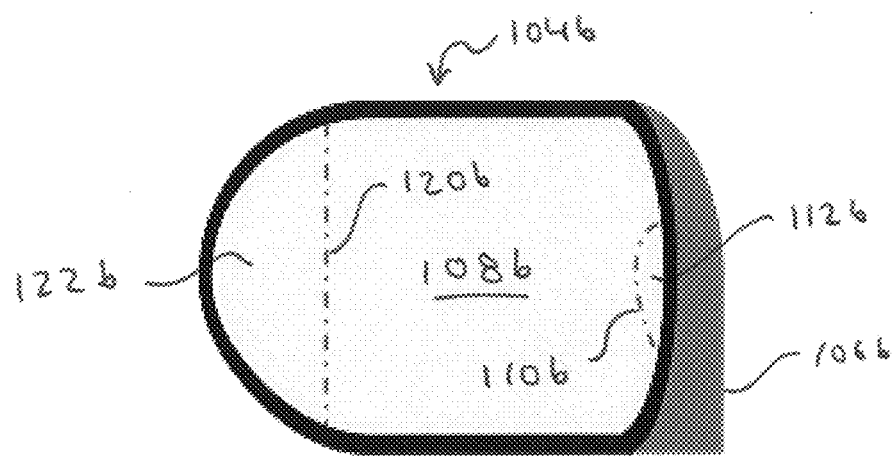
FIG. 4 is a plan view of an alternate embodiment of a side view mirror assembly in accordance with an alternate embodiment of the present invention.
Figure 5:
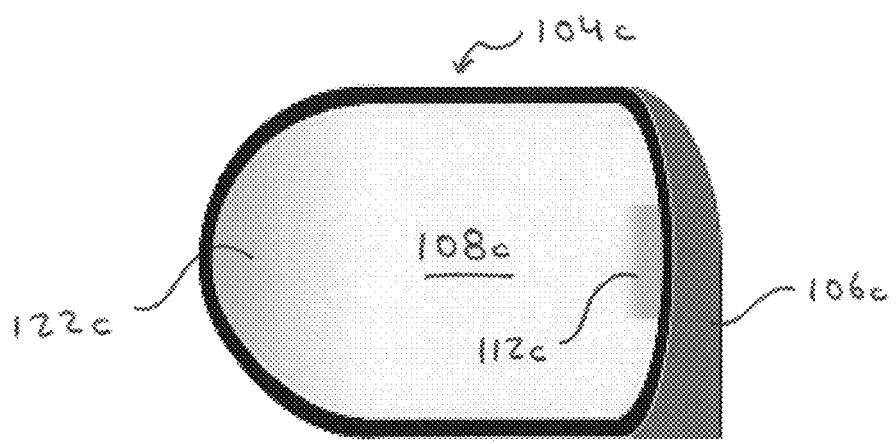
FIG. 5 is a plan view of an alternate embodiment of a side view mirror assembly in accordance with an alternate embodiment of the present invention.
Figure 6:
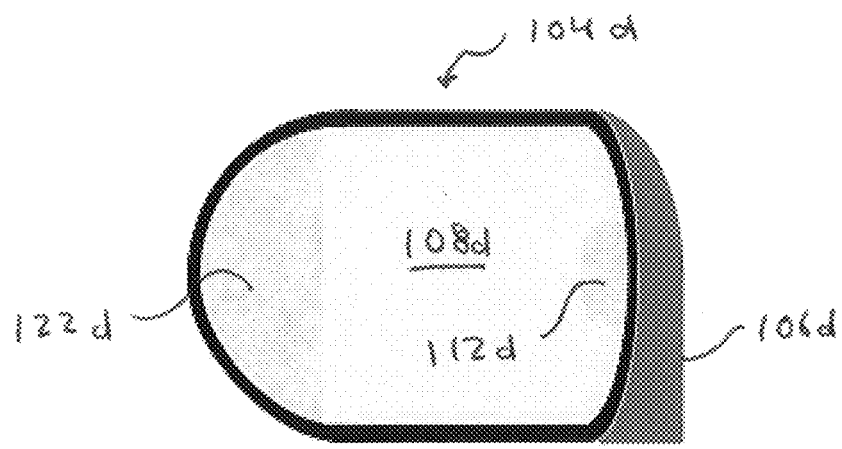
FIG. 6 is a plan view of an alternate embodiment of a side view mirror assembly in accordance with an alternate embodiment of the present invention.
Figure 7:
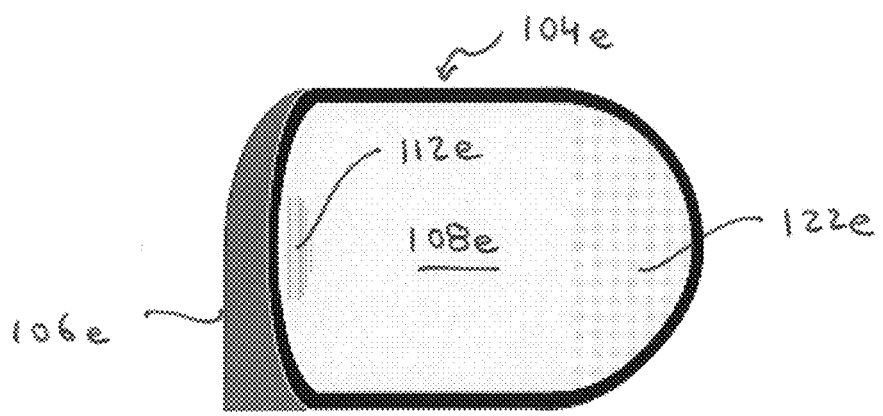
FIG. 7 is a plan view of an alternate embodiment of a side view mirror assembly in accordance with an alternate embodiment of the present invention.

Referring again to FIGS. 3A and 3B, in a first embodiment of the side view mirror assembly 104a, the first marking 110a and the second marking 120a are formed by solid lines. As shown in FIG. 4, in an alternate embodiment of the side view mirror assembly 104b, the first marking 110b and the second marking 120b are formed by dashed lines. As shown in FIG. 5, in yet another alternate embodiment of a side view mirror assembly 104c, the first portion 112c and the second portion 122c of the side view mirror 108c are defined by shaded or color variation portions in the glass and/or the reflective coating inside the side view mirror 108c. Referring to FIGS. 6 and 7, alternate patterns for shading the first portion 112d and 112e, and the second portions 122d and 122e, are shown for additional alternate embodiments of the side view mirror assembly 104d and 104e, respectively. As well, in further alternate embodiments, the first marking 110 and the second marking 120 may be formed by stickers that are applied to the outer surface of the mirrors, they may be formed on the reflective layer that is disposed below the transparent layer of the mirror, or they may be etched into the outer surface of the mirror.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

What is claimed is:

1. A side view mirror assembly for use by an operator of an vehicle, comprising:
    a mirror housing mounted to an outer surface of the vehicle;
    a side view mirror including a reflective surface, the side view mirror being mounted in the mirror housing so that the side view mirror reflects items disposed rearwardly of the vehicle, wherein the side view mirror is configured for adjustment with respect to the mirror housing so that an angle of the mirror with respect to the mirror housing is selectively changeable;
    a first marking that is visible on the reflective surface of the side view mirror so that a reflection of a portion of the vehicle falls within a first portion of the reflective surface that is defined by the first marking;
    an adjustment assembly disposed within the mirror housing, wherein the adjustment assembly is connected to the side view mirror and is configured to adjust the angle of the side view mirror with respect to the mirror housing;
    a sensor that is configured to detect a position of a portion of the operator of the vehicle with respect to the side view mirror assembly and produce an input signal that is indicative of the position of the portion of the operator of the vehicle; and
    a processor configured to receive the input signal and produce a control signal that is received by the adjustment assembly of the side view mirror assembly, thereby causing the adjustment assembly to adjust the angle of the side view mirror with respect to the mirror housing.

2. The side view mirror assembly recited in claim 1, wherein the first marking is a line that is adhered to an outer surface of the side view mirror.

3. The side view mirror assembly recited in claim 1, wherein the first marking is a line that is etched into an outer surface of the side view mirror.

4. The side view mirror assembly recited in claim 1, wherein the first marking is one of a solid line or a dotted line.

5. The side view mirror assembly recited in claim 1, wherein the side view mirror further comprises a reflective coating disposed under a transparent portion and the first marker is one of a shaded portion or a colored portion of the reflecting coating.

6. The side view mirror assembly recited in claim 1, further comprising a second marking that is visible on the reflective surface of the side view mirror, the second marking defining a second portion of the reflective surface.

7. The side view mirror assembly recited in claim 6, wherein the second portion of the reflective surface defines an outermost portion of a field of view of the operator of the vehicle.

8. The side view mirror assembly recited in claim 1, wherein the processor is configured to run one of face recognition software and lens focusing software that is configured to determine the position of the portion of the operator of the vehicle based on the input signal from the sensor.

9. A method of adjusting an angle of a side view mirror of an vehicle in accordance with a position of an operator of the vehicle, comprising the steps of:
    providing a sensor that is operatively engaged with a portion of the operator of the vehicle;
    determining a position of the portion of the operator of the vehicle;
    producing an input signal that is indicative of the position of the portion of the operator of the vehicle with respect to the side view mirror; and
    adjusting the angle of the side view mirror with respect to the vehicle based on the input signal.

10. The method of claim 9, further comprising the steps of:
    providing a processor that is configured to receive the input signal from the sensor and produce a control signal based on the input signal; and
    sending the control signal to the side view mirror so that the side view mirror is adjusted accordingly.

11. The method of claim 10, further comprising providing one of face recognition software and lens focusing software that is configured to determine the position of the portion of the operator of the vehicle based on the input signal.

12. The method of claim 11, wherein the step of determining the position of the portion of the operator of the vehicle further comprises determining the position of a head of the operator of the vehicle.

* * * * *